United States Statutory Invention Registration [19]

[11] Reg. Number: H610

Focarile et al. [43] Published: Mar. 7, 1989

[54] CELLULAR PAGER

[75] Inventors: Joseph F. Focarile, Gladstone; David B. Kunkee, Holmdel; Robert T. Saizan; Shyamal Sengupta, both of Howell, all of N.J.

[73] Assignees: American Telephone and Telegraph Company; AT&T Information Systems, Incorporated, both of Murray Hill, N.J.

[21] Appl. No.: 86,441

[22] Filed: Aug. 17, 1987

[51] Int. Cl.[4] ..... H07Q 7/04; H04Q 1/30; H04B 11/32

[52] U.S. Cl. ..... 379/60; 340/311.1; 340/825.44; 379/57; 379/59; 455/33; 455/166

[58] Field of Search ..... 379/57, 58, 60, 59; 340/825.44, 311.1; 455/33, 161, 166, 32

[56] References Cited

U.S. PATENT DOCUMENTS

| | | | |
|---|---|---|---|
| 3,575,558 | 4/1971 | Leyburn et al. . | |
| 3,818,145 | 6/1974 | Hanway . | |
| 4,178,475 | 12/1979 | Taylor et al. . | |
| 4,178,476 | 12/1979 | Frost . | |
| 4,385,295 | 5/1983 | Willard et al. . | |
| 4,477,808 | 10/1984 | Ichikawa . | |
| 4,513,443 | 4/1985 | Louttit | 455/52 |
| 4,549,311 | 11/1985 | McLaughlin | 455/227 |
| 4,563,680 | 1/1986 | Nakajima . | |
| 4,577,060 | 3/1986 | Webb et al. . | |
| 4,580,285 | 4/1986 | Richards | 455/161 |
| 4,644,347 | 2/1987 | Lucas et al. . | |
| 4,661,972 | 4/1987 | Kai | 379/57 |
| 4,670,906 | 6/1987 | Thro | 455/56 |
| 4,726,050 | 2/1988 | Menich et al. | 379/60 |

OTHER PUBLICATIONS

Advanced Mobile Phone Service System Description—Oct. 12,1982, System developed by Bell Telephone Laboratories and manufactured by Western Electric Company.

*Primary Examiner*—Stephen C. Buczinski
*Assistant Examiner*—Linda J. Wallace
*Attorney, Agent, or Firm*—Samuel R. Williamson

[57] ABSTRACT

A pager arranged for operation in a cellular radio system provides economy to subscribers and technological flexibility to a system operator. Paging service is available in any geographical area covered by the advanced mobile phone service system. Subscribers are thereby able to travel at will while continuing to receive page signals in the cellular system. A special set of geographically dispersed channels in the advanced mobile phone service system are dedicated nation-wide to signaling and call control functions. These channels are used by the pager to properly configure itself to receive a page signal. The pager scans these channels, tunes to the channel with the best received signal strength and synchronizes with a received data stream on this or a second best channel. The pager then awaits receipt of the page signal. The pager also automatically rescans the special channels periodically to insure that it is always tuned to the channel with the best received signal strength. Paging service to subscribers in a cellular radio system is provided by the pager when the full service of a cellular telephone is not desired. Alternatively, the pager is assigned the same number as an associated cellular telephone for providing a backup for telephone calls intended for the associated cellular telephone which is not "ON" because the subscriber is temporarily unavailable to answer the incoming call.

13 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CELLULAR PAGER

BACKGROUND OF THE INVENTION

1. Technical Field

The present invention relates to page receivers and more specifically, to a page receiver operable in a multichannel radio system.

2. Description of the Prior Art

Radio paging systems are well known in the art. These systems typically comprise a radio transmitter for transmitting a coded paging signal representative of the party being paged and a mobile pager for notifying the designated party that he or she is being paged. The radio transmitter is accessible via the public switched telephone network to a person who wishes to reach a party carrying a pager. To reach the designated party, the person dials a telephone number which identifies the party to be paged and causes the coded page signal to be generated. Once the page signal is generated, the radio transmitter is activated and the paging signal is transmitted to all mobile pagers which are within the range of the transmitter. Each mobile pager is coded to respond to a different paging signal so that only the pager having a code corresponding to the code on the transmitted paging signal is activated. The pager responds to its corresponding paging signal by emitting an audible tone or some other appropriate signal. Upon receiving the notification of a page, the designated party responds by following a prearranged course of action, such as calling a specific telephone number to receive further instructions.

Present radio paging systems having effective ranges which vary considerably. The effective range of a radio paging system is dependent upon many factors with one of the most determining factors being the distance between the radio transmitter and the paging receiver. To increase the reliable range of a radio paging system, it is possible to use more than one radio transmitter strategically located within the paging service area. With this arrangement, a paging receiver has a higher probability of being activated by a signal from one of the radio transmitters.

There is increasing interest in expanding the availability of paging to beyond the local paging service area served by a few transmitters. Several methods have proposed for providing such a paging system. One method for expanding paging coverage beyond a single paging service area would be to provide each customer with more than one telephone number which could be dialed to reach the subscriber. Each phone number would be assigned to the subscribed and located in a different paging service area.

Another proposal for providing nationwide paging involves employing a master transmit station to communicate pages to and from several base stations employing a type of hub and spoke arrangement. Subscribers may move freely from one paging service area to another and transfer their paging service. While the subscribers are in transmit, pages are automatically stored. If the subscriber is paged during the transit period, he is paged when his paging service is transferred upon arrival at his destination area.

Still another proposal for providing a nationwide paging system involves employing a multiple frequency receiver which receives special coded message signal reflecting that a page message is being sent on a local frequency. In the absence of the special coded message signal, the receiver is programmed to switch to a different designated nationwide frequency for receiving the page message.

Although each one of the above systems provide reasonable widespread radio paging services, each system requires a break in paging service as a subscriber moves from one paging service area to another or cumbersome techniques for effectuating the required transfer of the paging service. Each system would also appear to require considerable investments for any future expansion in addition to being technologically limited if future demands for more comprehensive subscriber facilities and services continue. It is therefore desirable to have a pager suitable for operation in a system providing sophisticated facilities which allow for continuous paging service and economy to subscribers while allowing unlimited adaptability and expansion for effectuating a nationwide paging capability.

SUMMARY OF THE INVENTION

In accordance with the invention, a pager operating in a cellular radio system overcomes most of the inherent inflexibilities of the above-mentioned and other prior art pages as well as provides comprehensive sophisticated facilities and economy to subscribers and technological flexibility to a system operator. The cellular radio system provides paging service to subscribers similar to that presently provided on a local basis by numerous entities; however, service is easily extended to cover any desired geographical area within a basic coverage region or mobile service area within the nation-wide advanced mobile phone service (AMPS) systems. Subscribers are thereby able to travel at will while continuing to receive page signals in the system.

The pager operates in the cellular radio system without the need for specialized communications facilities by making use of call processing operations available in the AMPS system. In the AMPS system, a special set of channels that are geographically dispersed are dedicated nation-wide to signaling and call control functions for a mobile telephone and are also used by the pager to properly configure itself to receive a page signal. The page signals are transmitted on these or other channels throughout the mobile service area. And communication links exist between mobile service areas so that a pager may be reached anywhere within the AMPS system.

The pager configures itself to receive a page signal by scanning the special set of channels and the frequencies of the two channels with the best received signal strength are stored in memory. These frequencies are then recalled in descending order of signal strength and an attempt is made to acquire word synchronization with a received digital data stream on the first and, if necessary, the second one of these two channels.

When synchronization is achieved from a channel upon which the page signal may be received, the pager locks onto this channel and switches to an idle mode. In this mode, the pager interprets the data and continues to monitor the chosen paging channel, unless some condition requires it to rescan. The pager also automatically rescans the special channels periodically to insure that it is using the best channel then available. If the pager finds that it is not tuned to the best channel, it then repeats the best channel selection procedure. Once a page signal directed to the pager is received, a visual alerter and, if desired by the user, an acoustic alerter respond for providing a page indication to the user.

Operating in the cellular radio system, the pager provides an economical and fully automatic paging service to subscribers when the full service of a cellular telephone is not desired. The pager also provides a backup for cellular telephone calls intended for an associated cellular telephone which is not "ON" because the subscriber is, for example, temporarily away from his or her automobile containing the cellular telephone. Assigned the same number as the associated cellular telephone, the pager provides an alert signal to the subscriber of the cellular telephone indicating that a caller is trying to reach the telephone's assigned number. Since no response is received in this instance, the call is routed to an operator or recording device using a call forwarding feature of a mobile telephone switching office (MTSO). The MTSO is the central coordinating element for AMPS and interfaces directly with the public switched telephone network. The operator or recording device logs the caller's telephone number and any message. The subscriber is then able to call an appropriate service number for this information when he or she returns to the automobile and turns "ON" the cellular telephone. In the alternative, the subscriber may place the call through a telephone connected directly to the public switched telephone network.

BRIEF DESCRIPTION OF THE DRAWING

The invention will be more clearly understood from a consideration of the following detailed description of an illustrative embodiment of the invention and the accompanying drawing in which.

DETAILED DESCRIPTION

Figure 1:
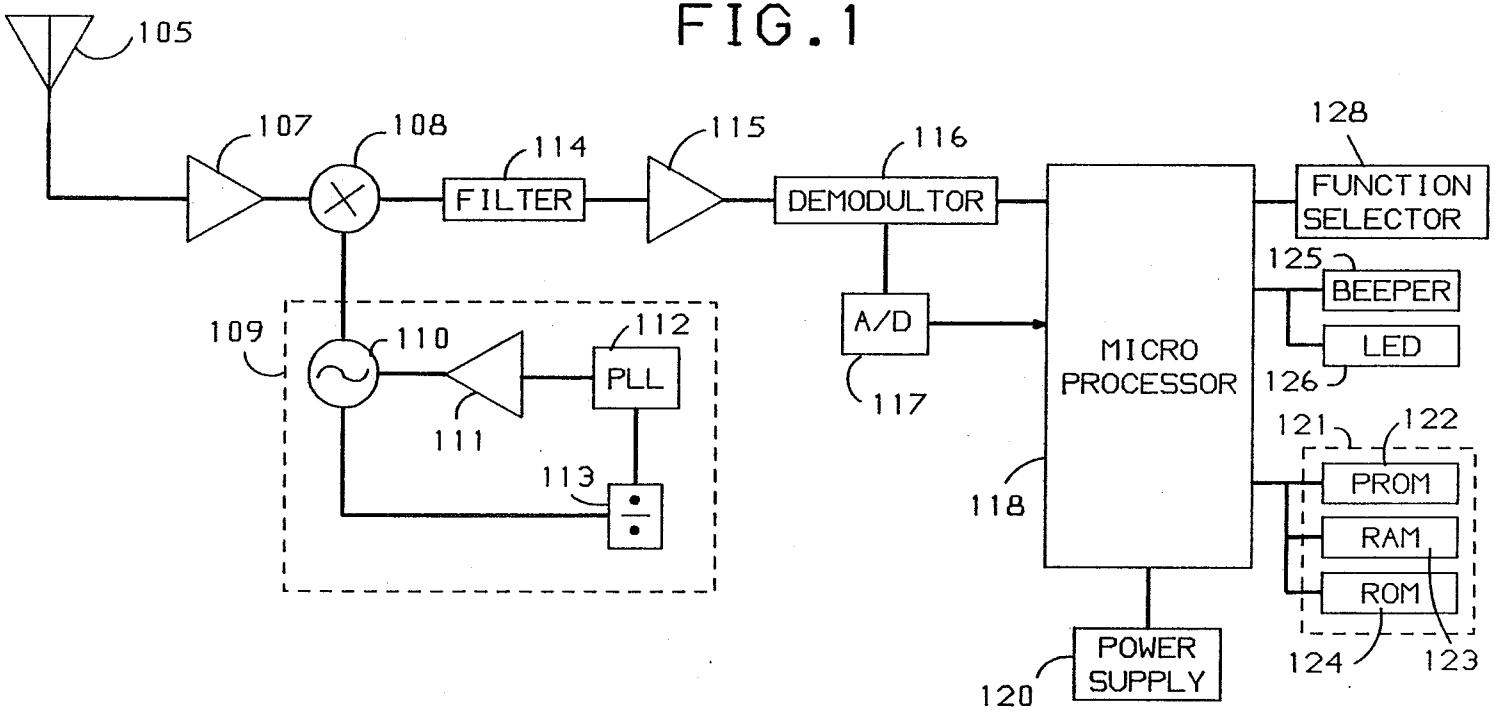
FIG. 1 shows a block diagram of a cellular pager unit in accordance with the invention.

A functional block diagram of a cellular pager unit is shown in FIG. 1. Operable in the advanced mobile phone service (AMPS) system, the cellular pager unit adopts calls processing operations used in a mobile service area (MSA). A full description of the AMPS system is available in the Bell System Technical Journal, Volume 58, Number 1, January 1979. A series of articles directed to the AMPS system are contained therein on pages 1 through 269. In The AMPS system, a special set of 21 channels, geographically dispersed, are designated as initial set-up or control channels and are provided in addition to the normal voice channels used by cellular mobile transceivers. These set-up channels are dedicated nation-wide to signaling and call control functions for a mobile telephone and are also used by the pager unit to properly configure itself to receive a page message. The page messages provided to paging units are also typically included on these set-up channels. Other channels may also be used to carry the page message, however, and the pager unit is capable of switching to another channel upon receipt of appropriate instructions. Page messages are transmitted on channels throughout the MSA. Communication links exist between MSA's so that a pager unit may be reached anywhere within the AMPS system. Within the subscriber's MSA (Home), a local number (7 digits) is all that is necessary to initiate the page. Outside of this MSA, a roamer access code, which is specific to the MSA within which the subscriber is then physically located, must be dialed prior to dialing the local number.

In order for the pager unit to configure itself to receive a page message, the specified set-up channels are scanned and the frequency of the two channels with the best received signal strength are stored in memory. These frequencies are then recalled in descending order of signal strength and an attempt is made to acquire word synchronization on the first and then the second one of these two best channels.

When synchronization is achieved on a set-up channel, the pager monitors this channel until it receives a control message. From the control message it determines the identity of the serving system and the paging channel set. The paging channel set comprises a list of channels upon which the page message may be received. The pager then repeats the channel scanning procedure on the paging channel set. Once word synchronization is acquired on a paging channel, the pager unit locks onto this channel and switches to the idle mode. In this mode, the pager unit interprets the data and continues to monitor the chosen paging channel, unless some condition requires it to rescan. The pager unit also automatically rescans the set-up channels periodically to insure that it is using the best channel then available. In general, the pager unit takes no other action unless it misses word synchronization, receives either a page message or additional control information. The additional control information could typically be the instructions which directs the pager unit to switch to another designated channel for receiving the page message. When a page message is received, the pager unit enters a page processing mode which is described in detail later herein.

The functional block diagram of the cellular pager unit shown in FIG. 1, is operative in accordance with the principles of the invention. A page signal containing a page message from a cellular service provided is received over an antenna 105 and coupled via an amplifier 107 into a mixer section 108. A signal from a local oscillator section 109, including a voltage controlled oscillator 110, a phase detector 111, a synthesizer phase locked loop 112 and a prescaler 113, is also coupled into the mixer section 108 for combing with the page signal and producing an intermediate frequency signal. This intermediate frequency signal is coupled through a two-pole crystal filter 114 and also a low-noise amplifier 115 to a demodulator 116. This demodulator provides a clock signal and non-return-to-zero (NRZ) data to a microprocessor 118 for further processing the NRZ data is a continuous data stream which contains bit synchronization and word synchronization for use by the microprocessor 118 in achieving framing of the incoming message words. A measure of the received signal strength is also provided from the demodulator 116 to the microprocessor 118 via an analog-to-digital converter 117.

Operational control of the pager unit is provided by the microprocessor 118. This is achieved through a number of control functions executed by the microprocessor. A microprocessor commercially available from NEC as Part No. 80C50 may be used as the microprocesor 118 with the proper programming. Once the microprocessor 118 has synchronized with the data stream being transmitted by the serving system, it then begins interpreting the data in order to determine if it includes a valid control message. The microprocessor also determines the identity of the serving system in order to decide whether the cellular pager unit is then in its Home or a Roam area discussed later herein. The microprocessor also provides the necessary control which enables the pager unit to respond to control messages in addition to the page messages. As earlier indicated, these other messages may include instructions which reassign the pager unit to a difficult control channel.

The microprocessor 118 also provides operational control to a number of internal component sections in the cellular pager unit. The component sections are all connected directly to the microprocessor 118. A memory section 121 for the microprocessor 118 includes programmable read only memory (PROM) 122, random access memory (RAM) 123 and read only memory 124. The PROM 122 is a nonvolatile memory and stores information which is specific to each pager unit operating in the cellular system. Such information includes data indicative of an initial page channel, a home system identification number and a serial number. Information to this memory is preprogrammed into the pager via an external interface (not shown). A control program for the microprocessor 118 is also provided by the ROM 124.

A function selector unit 128 is available to the user for configuring some of the operations of the pager unit. Included in this function selector unit 128 is an on-off and mode switch for respectively activating the pager unit and for selecting either a normal or a silient mode of operation to be described in greater detail later herein. A recall/reset control is also included in the function selector unit 128 to recall from the memory 123 any page message indications then existing therein and also to cancel these page message indications. If there is a page message indication in the memory when this control is activated, a page message is provided. Otherwise a confirmation tone is provided to the user.

Indicators available in the pager unit for alerting a user upon receipt of a page message include an acoustic alerter such as a beeper 125, and a visual alerter such as a light-emitting-diode (LED) 126. In a normal paging mode the acoustic alerter and the visual alerter both respond to the paging signal. In a silent paging mode, however, only the visual alerter responds with the acoustic alerter being deactivated. Once the pager unit recognizes its page message, the visual and acoustic alerter, when enabled, is activated for approximately ten seconds. An external page alert reset control (activated by the user) or the expiration of time silences this alerter.

Also included in the function selector unit 128 is a Roam system select switch which allows the user to select the channel set of the system to which access is desired. This selection is only available in the Roam mode, however. During normal operation, when the pager unit is operating in its Home area, the pager unit selects the service system from information stored in the non-volatile memory 122.

Power for the cellular pager is provided by a power supply 120 comprising primary batteries. A battery life detector circuit is included in the power supply 120 for providing an indication to the microprocessor 118 when battery voltage drops below a predetermined level.

When operation power is applied to the pager unit, it performs internal diagnostic tests on the microprocessor 118 and the other component sections. A confirmation indication signals the successful completion of these tests. If, however, the battery test detects a low battery condition, and all other tests are successful, a confirmation/low battery indication is provided to the user. Otherwise no indication is given. Once sucessfully powered up, the pager unit begins the process of selecting a suitable set-up channel.

Figure 2:
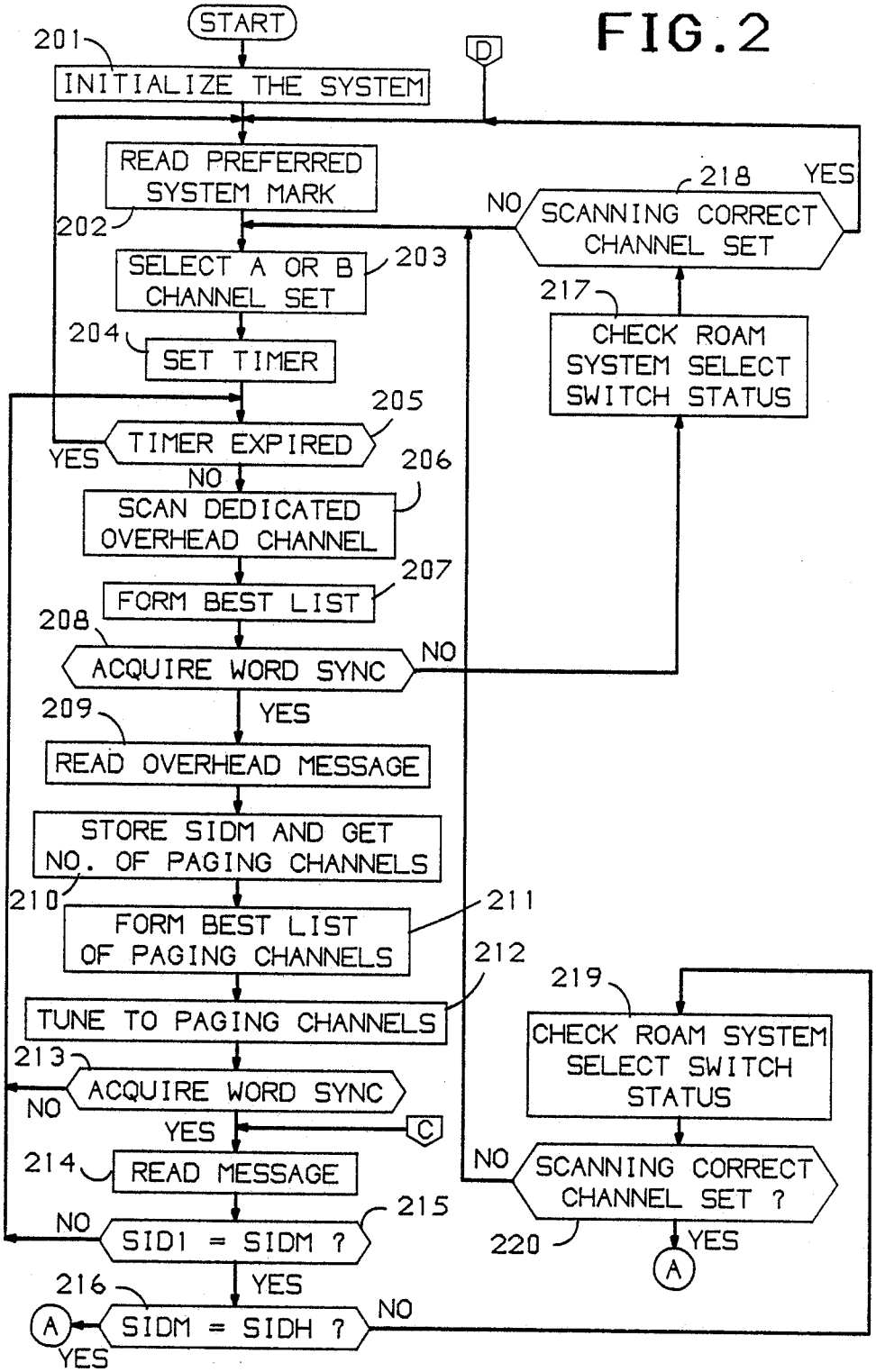
FIGS. 2 through 4 show flow charts of some of the functions performed by the cellular pager unit of FIG. 1 in accordance with the invention.
Figure 3:
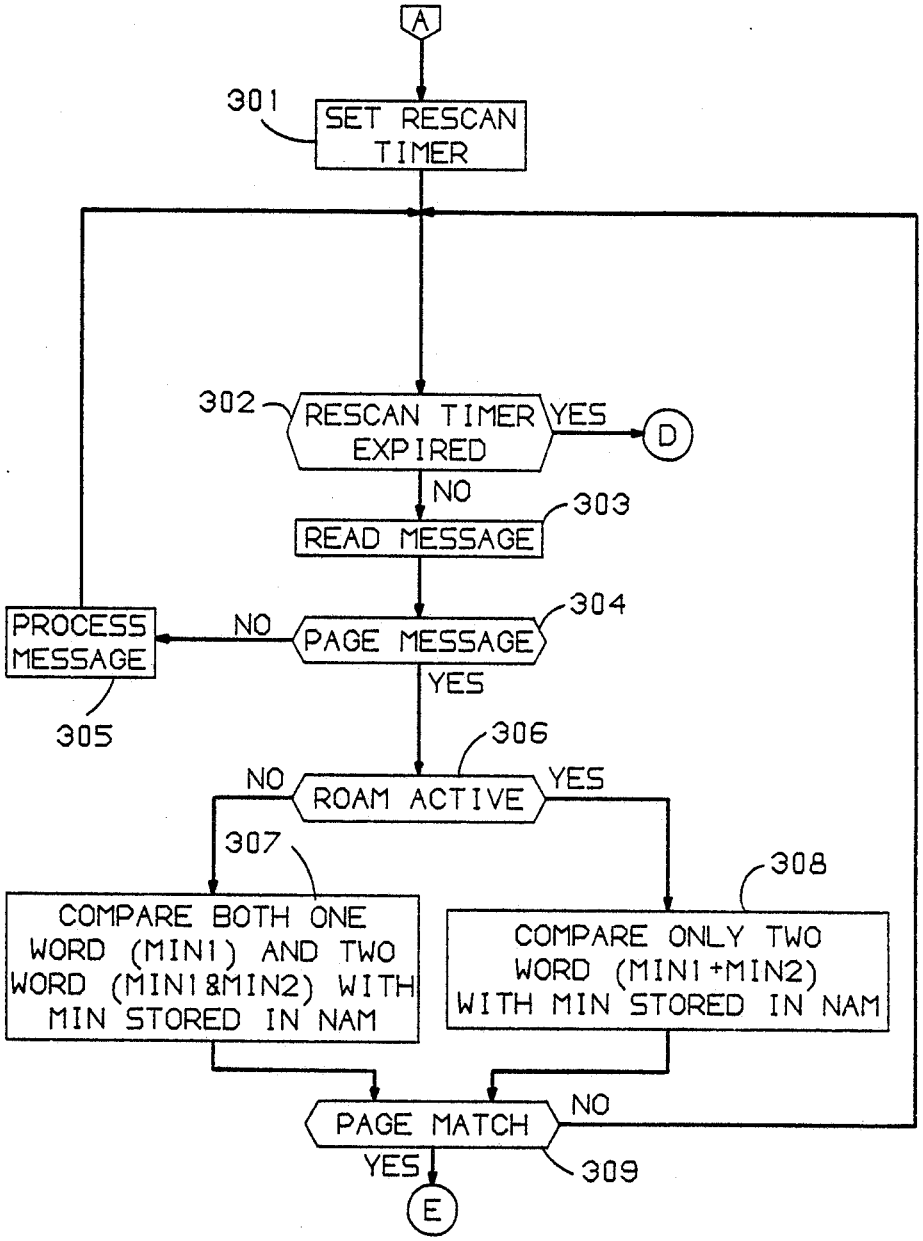
Figure 4:
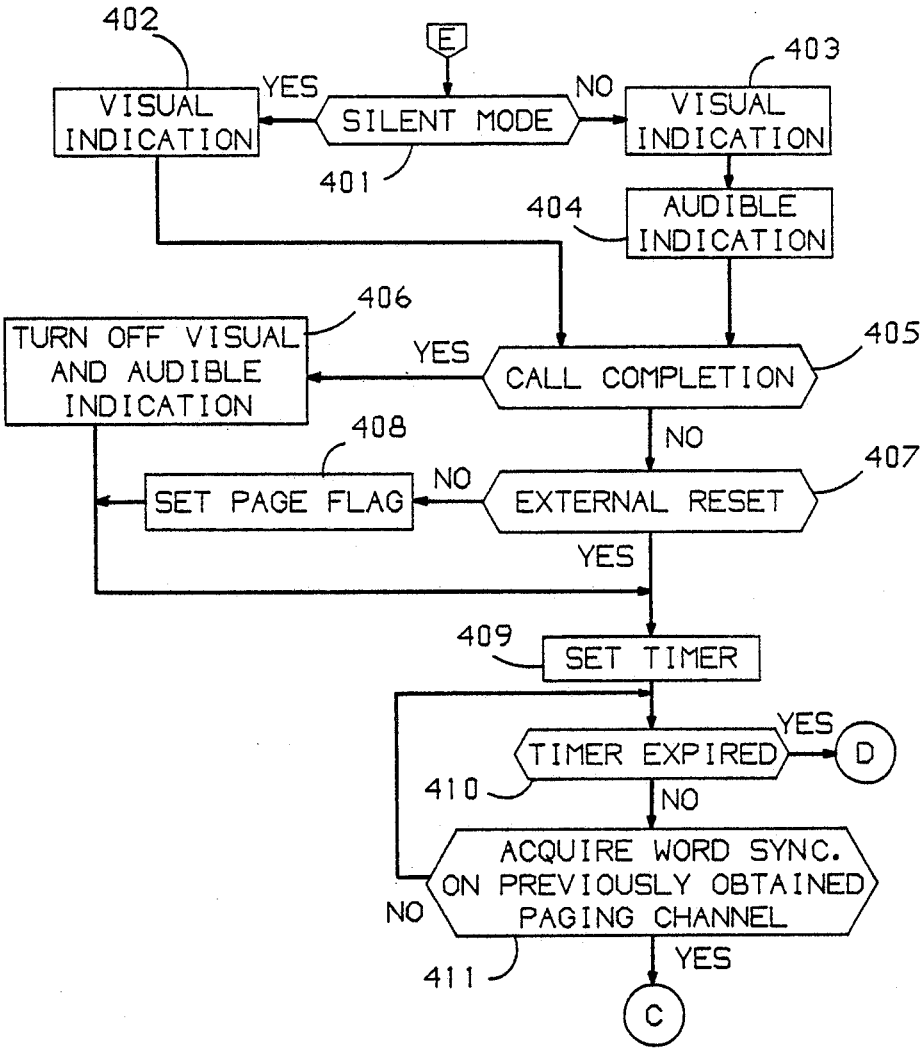

Referring now to FIGS. 2, 3 and 4, there are shown flow charts illustrating some of the functions performed by the circuitry of FIG. 1. These functions are advantageously determined by a process or program designed for operation on a microprocessor such as microprocessor 118.

The process is entered at step 201 wherein the initializing parameters are set. Initialization occurs when power is first applied to the pager unit. Upon successful initialization, the pager unit provides a confirmation tone to the user. The process next advances to step 202 where a preferred system mark stored in memory is read and the user's preferred channel set of Home area is thereby determined. This preferred channel set comprises either a first set of channels (Set A) or a second set of channels (Set B). The process next advances to step 203 where either channel set A or channel set B is selected for scanning. Once the pager unit selects the appropriate channel set for scanning, the process advances to step 204 and sets a timer. The timer in step 204 defines a time period during which the pager unit will try to obtain service. After the timer is set, the process advances to the decision 205 and checks to see if the timer has expired. If the time has not expired, the process advances to step 206 where the overhead or set-up channels are scanned. From this scanning, the two channels with the strongest signals are selected at step 207 and assembled into a list with the channel with the strongest signal being first and the channel with the second strongest signal being second. The pager unit next tries to acquire word synchronization at step 208 from the first one and then the second one of the two best channels.

If word synchronization cannot be obtained on the preferred channel set, the pager unit scans the channel set specified by the Roam System Select switch, if different from the preferred channel set. The pager unit checks the status of the Roam System Select switch at step 217 and a determination is made in decision 218 as to whether the correct channel set is being scanned. If the incorrect channel set is being scanned, the process returns to step 203, selects the appropriate channel set, again sets the timer in step 204 and continues in this loop. If the decision 218, it is determined that the correct channel set is being scanned without acquiring word synchronization, the process returns to step 202, reads the preferred system mark and continues in this loop.

If the word synchronization is acquired in decision 208, the pager unit begins reading the overhead messages at step 209 and at step 210 stores the received system identification number for mobile service area (SIDM) and obtains the number of paging channels that should be scanned in that particular system. Once these channels are obtained, the process advances to step 211 where the best list of two paging channels are identified for scanning by prioritizing the channels in terms of received signal strength from the strongest to the weakest signal. In step 212 the pager unit is tuned to the paging channel with the strongest signal and word synchronization is attempted at decision 213. If word synchronization is not acquired at decision 213, the process returns to step 205 and checks to see if the timer has expired. If the timer has not expired, then the steps in the flow diagram are repeated beginning with step 206.

If word synchronization is acquired on the paging channel in decision 213, the messages are read in step 214 and the first part of the serving area's received system identification number (SID1), obtained from reading the paging channel, is compared with the SIDM obtained while reading the messages on the dedicated overhead channel in step 209. If the SID1 does not match the SIDM as determined in decision 215, the process returns to step 205 and checks to see if there is time remaining on the timer. If the timer has not expired then the steps are repeated beginning with step 206. If the SID1 matches with the SIDM, then at step 216 the pager unit compares the SIDM derived from the messages in step 209 and the system identification number for the home service area (SIDH) which is stored in the number assignment module (NAM) in the memory section of the pager unit. If these match, the pager unit is considered to be in the Home area and the process advances to step 301 shown in FIG. 3.

If the SIDM does not match with SIDH at step 216, the process advances to step 219, where the Roam system select switch status is checked and a determination made in decision 220 as to whether the correct channel set is being scanned. If so, the pager unit is considereed to be in a Roam service area and the process advances to step 301.

At step 301, a rescan timer is set. This timer defines a predetermined time period after which the pager unit is essentially recycled and the channel set selection process reexecuted in order to determined the service area that the pager unit is then operating. The process next advances to step 302 and checks if the rescan timer has expired. If so, the process returns to step 202 and reads the preferred system mark. If the timer has not expired, the process advances to step 303.

At step 303, the received messages are read and a determination is made at decision 304 as to whether a received messages is a page message or other control message. If the message is not a page message, it is then processed at step 305 as appropriate. The process then returns to step 302 and checks to see if the rescan timer has expired. If the time has not expired, then the messages are read once again in step 303 and the process continues in this loop until a page message is received or the rescan timer expires.

When a page message is received, a determination is made at decision 306 as to whether the pager unit is in the Home or Roam service area. If the pager unit is in the Home service area, the process advances to step 306. Otherwise, the process advances to step 308.

At step 307, a comparison is made of a mobile identification number 1 (MIN1) and then both MIN1 and a mobile identification number 2 (MIN2), respectively, with the mobile identification numbers (MINs) stored in the NAM, the MIN1 is the pager unit's seven digit telephone number and the MIN2 is the area code of the cellular pager when it is in its Home service area. If the comparison of MIN1 and also MIN1 and MIN2 match the MINs stored in the NAM as determined by the decision 309, the pager unit is being paged.

At step 308, the MIN1 and the MIN2 are compared with the MINs stored in the NAM of the pager unit. If the MIN1 and MIN2 in step 308 matches the stored MINs as determined by decision 309, the pager unit is being paged.

If there is no page match at decision 309, the process returns to step 302 where the expiration of the rescan time is checked. If the timer has not expired, the process is repeated beginning with step 303.

Once a page match is provided in decision 309, the process advances to decision 401 (shown in FIG. 4) to determine whether the silent mode of operation of the pager unit is enabled. If the silent mode is enabled, the process advances to step 402 where a visual indication, such as a LED of other visual device is provided. If, however, the silent mode is not enabled, a visual indication in step 403 and an audible alert in step 404 are set by the proces and are activated for a predetermined time period. The process next advances to step 405 where the pager unit monitors the possibility of the call completion. If the call is completed, the pager unit turns off the visual and audible indication at step 406. If there is no call completion at step 405, the process advances to decision 407 to determined if the user of the pager unit has triggered an external reset. If not, the process advances to step 408 and sets the page flag so that the user will be aware that the pager unit has received a page message. From the steps 406 and 408 and the decision 407, the process advances to the step 409 where a timer is set. This timer requires that word synchronization be acquired within a predetermined time period.

Decision 410 monitors the time remaining on the timer set in step 409. If the timer has expired, the process returns to step 202 in FIG. 2 and the flow diagram is executed beginning with this step. If the timer has not expired, the process advances to decision 411 and attempts to acquire word synchronization from the paging channel previously obtained in step 213 in FIG. 2. If word synchronization is acquired, the process advances to step 214 where the messages are read once again. If word synchronization is not obtained, the process returns to decision 410 in order to determine if the time has expired. The process remains in this waiting loop, decisions 410 and 411, either until the timer expires or word synchronization is acquired.

Although pagers are available in the art, the present invention provides a unique way of providing paging in a multichannel radio system thereby convering a much larger area; and while a specific embodiment is enclosed, it is understood that various modification are possible within the spirit and scope of the invention.

The number access module in the pager unit, for example, is easily configured to contain several different mobile identification numbers by storing as many numbers in memory as desired. And the pager unit is corresponding configured to contain multiple visual indicators for providing a distinctive alerting signal for each number. In this configuration, the pager unit compares each of these stored numbers with the numbers received in a page message. Upon receipt of a number matching any one of the stored numbers, the pager unit provides a distincitive alerting signal reflective of the received number. Another implementation of the pager is obtained by simply programming the microprocessor in the pager such that it monitors a digital data stream for receipt of a telephone number assigned to a mobile telephone. The pager is carried by the user of the mobile telephone whenever he or she is located remote from the movile telephone. An alert indication for the user is thereby conveniently provided whenever a telephone call directed to the mobile telephone is attempted. Yet another implementation of the pager may be obtained by arranging the visual alert indication such that is comprises an alphanumeric display. Additional information as to the name of the caller, a number at which he or she may be reached the purpose for the call or other such useful information may be included in the digital data stream on a channel transmitted in a multichannel radio system.

What is claimed is:

1. A receiver for operation in a multichannel radio system and for monitoring a digital data stream on a selected channel within the radio sytem, the receiver providing an alert indication in response to receipt of a predetermined digital signal within the data stream, the receiver comprising:

means for scanning a preselected group of channels being transmitted from radio transmitters in a plurality of locations; and means for determining the selected channel from the preselected group of channels, in response to the scanning means, the determining means comparing the received signal level of the digital data stream of each of the preselected group of channels, the selected channel being reflective of a transmitter at a location providing to the receiver the optimum received signal level.

2. The receiver as recited in claim 1 further including means for selecting an alternative preselected group of channels, and means for determining the selected channel from the alternative preselected group of channels, the selected channel being determined by comparing the received signal level of the digital data stream of each channel in the alternative preselected group of channels, the selected channel being reflective of a transmitter at a location providing the optimum received signal level.

3. The receiver as recited in claim 1 further including means for providing distinctive alert indications in response to receipt of multiple digital signals in the digital data stream, each one of the distinctive alert indications being reflective of a predetermined digital signal.

4. The receiver as recited in claim 1 further including means for monitoring the received signal level of the digital data stream on the selected channel, the monitoring means activating the selected channel determining means whenever the received signal level falls below a predetermined level.

5. a receiver for operation in a multichannel mobile telephone system and for monitoring a digital data stream on a selected channel within the mobile telephone system, the receiver providing an alert indication in reponse to receipt of a predetermined digital signal within the data stream, the digital signal being indicative of an alerting signal for activating an associated mobile telepone, the receiver being separable from the mobile telephone and comprising:

means for scanning a preselected group of channels being transmitted from radio transmitters in a plurality of locations; and means for determining the selected channel from the preselected group of channels, in response to the scanning means, the determining means comparing the received signal level of the digital data stream of each of the preselected group of channels, the selected channel being reflective of a transmitter at a location providing to the receiver the optimum received signal level.

6. The receiver as recited in claim 5 further including means responsive to the associated mobile telephone going off-hook, the off-hook means canceling the alert indication in response to receipt of a predetermined digital signal within the data stream reflecting that the mobile telephone has gone off-hook.

7. A method of operating a receiver in a multichannel radio system and for monitoring a digital data stream on a selected channel within the radio system, the method comprising the steps of:

scanning a preselected group of channels being transmitted from radio transmitters in a plurality of locations;

determining the selected channel from the preselected group of channels by comparing the received signal level of the digital data stream of each of the preselected group of channels, the selected channel being reflective of a transmitter at a location providing to the receiver the optimum received signal level; and providing an alert indication in response to receipt of a predetermined digital signal within the data stream.

8. The method of operating a receiver as recited in claim 7 further including the steps of selecting an alternative preselected group of channels, and determining the selected channel from the alternative preselected group of channels, the selected channel being determined by comparing the received signal level of the digital data stream of each channel in the alternative preselected group of channels, the selected channel being reflective of a transmitter at a location providing the optimum received signal level.

9. The method of operating a receiver as recited in claim 7 further including the step of providing distinctive alert indications in response to receipt of multiple digital signals in the digital data stream, each one of the distinctive alert indications being reflective of a predetermined digital signal.

10. The method of operating a receiver as recited in claim 7 further including the step of monitoring the received signal level of the digital data stream on the selected channel, the monitoring step activating the selected channel determining step whenever the received signal level falls below a predetermined level.

11. A method of operating a receiver in a multichannel mobile telephone system and for monitoring a digital data stream on a selected channel within the mobile telephone system, the method comprising the steps of:

scanning a preselected group of channels being transmitted from radio transmitters in a plurality of locations;

determining the selected channel from the preselected group of channels, the determining step comparing the received signal level of the digital data stream of each of the preselected group of channels, the selected channel being reflective of a transmitter at a location providing to the receiver the optimum received signal level; and providing an alert indication in response to receipt of a predetermined digital signal within the data stream, the digital signal being indicative of an alerting signal for activating an associated mobile telephone.

12. The method of operating a receiver as recited in claim 11 further including the step of canceling the alert indication, the canceling step being activated in response to receipt of a predetermined digital signal within the data stream reflecting that the associated mobile telephone has gone off-hook.

13. A multichannel radio paging system comprising:

multiple transmitter means in a plurality of locations for transmitting a digital data stream on a preselected group of channels;

receiver means for scanning the preselected group of channels being transmitted from radio transmitters within the transmitter means;

means for determining a selected channel from the preselected group of channels, in response to the receiver means, the determining means comparing the received signal level of the digital data stream in each of the preselected group of channels, the selected channel being reflective of a transmitter at a location providing to the receiver means the optimum received signal level; and means for monitoring the digital data stream on the selected channel, the monitoring means providing a page indication in response to receipt of a predetermined digital signal within the data stream.

* * * * *